US007048020B2

United States Patent
Durieux et al.

(10) Patent No.: US 7,048,020 B2
(45) Date of Patent: May 23, 2006

(54) DEVICE FOR FILLING VEHICLE TANK WITH LIQUID FUEL

(75) Inventors: Christophe Durieux, Gilly sur Isere (FR); Alain-Christophe Tiberghien, Sevrier (FR)

(73) Assignee: Staubli Faverges, Faverges (FR)

( * ) Notice: Subject to any disclaimer, the term of this patent is extended or adjusted under 35 U.S.C. 154(b) by 26 days.

(21) Appl. No.: 10/965,954

(22) Filed: Oct. 18, 2004

(65) Prior Publication Data

US 2005/0087261 A1  Apr. 28, 2005

(30) Foreign Application Priority Data

Oct. 22, 2003  (FR) .................................. 03 12342

(51) Int. Cl.
*B65B 1/04* (2006.01)
(52) U.S. Cl. ...................... 141/382; 141/301; 141/350; 220/86.2
(58) Field of Classification Search ................ 141/349, 141/350, 382, 387–389, 301, 302; 220/86.2; 137/641.04
See application file for complete search history.

(56) References Cited

U.S. PATENT DOCUMENTS 3,851,852 A * 12/1974 Blanchard et al. ........ 251/149.1
3,885,608 A * 5/1975 Ayres .......................... 141/354
4,059,135 A    11/1977 Hansel
5,634,505 A    6/1997 Wong
6,250,348 B1 * 6/2001 Reinholdt ................... 141/382
2002/0175227 A1    11/2002 Bell

FOREIGN PATENT DOCUMENTS

EP    0 487 844 A1    9/1991

OTHER PUBLICATIONS

Abstract in English of EP0487844.

* cited by examiner

*Primary Examiner*—Steven O. Douglas
(74) *Attorney, Agent, or Firm*—Dowell & Dowell, P.C.

(57) ABSTRACT

The device according to the invention comprises a connector on-board the vehicle, connected to the fuel tank via a pouring conduit and provided with a closure valve, and a filling element adapted to be connected to this connector. The filling element is provided with at least one member for detecting the abutment of the filling element on a fixed part of the connector, this member being adapted to control the displacement of a hook for locking the aforementioned element on the connector, between a first position where the hook is disengaged with respect to the connector and a second position where the hook is in engagement on the connector.

17 Claims, 5 Drawing Sheets

DEVICE FOR FILLING VEHICLE TANK WITH LIQUID FUEL

FIELD OF THE INVENTION

The invention relates to a device for filling a vehicle tank with liquid fuel.

BACKGROUND OF THE INVENTION

The invention is particularly concerned with the domain of automobile racing in which it is sometimes necessary to proceed with filling the fuel tank of a vehicle during a race, such filling having to take place under optimum safety conditions and in a minimum of time.

The equipment used up to the present time does not offer sufficient guarantees as to safety. In effect, it proves to be subject to leakages, which involves considerable risks of fire insofar as the motor of the racing vehicle often operates at very high temperature. In addition, the known equipment is heavy and relatively difficult to manipulate, this involving a relatively long time to fill the tank which may appreciably penalize the competitor during the race.

A particular risk of this type of equipment is that the operator in charge of filling a tank may attempt to pour fuel while the filling element in his hand is not correctly connected to the corresponding connector provided on the vehicle.

It is a more particular object of the invention to overcome these drawbacks by proposing a novel device for filling a vehicle tank with liquid fuel, whose use is securitized, while it allows flow with a high flowrate compatible with those desired, in particular, in the domain of automobile races.

In this spirit, the invention relates to a device for filling a vehicle tank with liquid fuel, this device comprising a connector on-board the vehicle, connected to the tank at least via a pouring conduit and provided with a closure valve, and a filling element adapted to be connected on this connector. This device is characterized in that the filling element is provided with at least one member for detecting the abutment of the filling element on a fixed part of the connector, this detection member being adapted to control the displacement of a hook for locking the filling element on the connector, between a first position where the hook is disengaged with respect to the connector and a second position where the hook is in engagement on this connector.

Thanks to the invention, the passage of the locking hook from its disengaged position towards its position in engagement on the connector occurs as a function of the detection of the abutment of the filling element on the connector, this avoiding errors of manipulation insofar as, as long as the abutment is not correct, the locking hook cannot attain its second position.

According to advantageous but non-obligatory aspects of the invention, a tank filling device may incorporate one or more of the following characteristics, taken in any technically admissible combination:

A plurality of detection members are distributed around a central axis of the filling element, each being adapted to control a locking hook The or each detection member is in the form of a finger mobile in translation in a direction substantially parallel to a central axis of the filling element.

The or each locking hook is adapted to prevent the displacement of a locking ring when it is not in engagement with the connector, this ring itself being adapted to prevent the displacement of a control member forming part of the filling element and mobile, with respect to the body of this element, parallel to a central axis of this element.

The locking ring is adapted to surround the or each hook and possibly a part of the connector when this or these hook(s) is or are in the second position mentioned above.

The kinematic linkage between the locking ring and the control member is a function of the position of the member with respect to the body of the filling element. In that case, an element for blocking the relative movement of the locking ring and of the control member is advantageously provided, this blocking element being received in a housing made to that end, of which the ring is adapted to be partially engaged, or not, in a housing made to that end in the control member.

The filling element comprises a slide in the form of a tubular sleeve adapted to come into abutment against an O-ring provided on an inner radial surface of the connector, the displacement of the slide with respect to the body of the filling element being controlled by the afore-mentioned control member. The kinematic linkage between the slide and the control member may be provided to be a function of the position of this member with respect to the body of the filling element.

The connector is provided with an outer peripheral groove for receiving a part of the locking hook or hooks when it is or they are in the second position mentioned above.

The connector is connected to the tank by a fuel flow conduit and by a gaseous phase circulation conduit, while a mobile member is adapted to pass, within this connector, from a first configuration where the mobile member allows a fluidic communication between these conduits and a second configuration where this member isolates these conduits from each other. The mobile member is advantageously adapted to be displaced from its first towards its second configuration by a part of the filling element. In that case, the mobile member may be provided to be displaceable from its first towards its second configuration by a pusher element fast with the control member and adapted to push the valve of the connector against elastic closure means, this valve itself being adapted to displace this mobile member.

The filling element forms two conduits dedicated respectively to the flow of fuel towards the tank and for the circulation of gaseous phase coming from the tank, while the connector is itself connected to the tank by two conduits respectively dedicated to the flow of fuel and to the circulation of gaseous phase, the fuel flow conduits being adapted to be fluidically connected, while the gaseous phase circulation conduits are adapted to be fluidically connected.

The movements of those parts of the filling element which are mobile with respect to the body of this element are controlled by at least one handle articulated on this body about an axis substantially orthogonal to the direction of displacement of this mobile part. In that case, this handle is advantageously equipped with a roller for transmission of effort to one of these mobile parts, this roller being received, with possibility of displacement, in a housing of corresponding shape, made in this mobile part.

Means are provided for elastic return of at least certain of the parts of the filling element mobile with respect to its body and/or of at least certain of the parts of the connector mobile with respect to the fixed part mentioned above, these return means pushing these mobile parts towards a configuration of closure and of separation of the filling element and of the connector.

BRIEF DESCRIPTION OF THE DRAWINGS

The invention will be more readily understood on reading the following description of an embodiment of a device in accordance with its principle, given solely by way of example and made with reference to the accompanying drawings, in which.

DESCRIPTION OF PREFERRED EMBODIMENT

Figure 1:
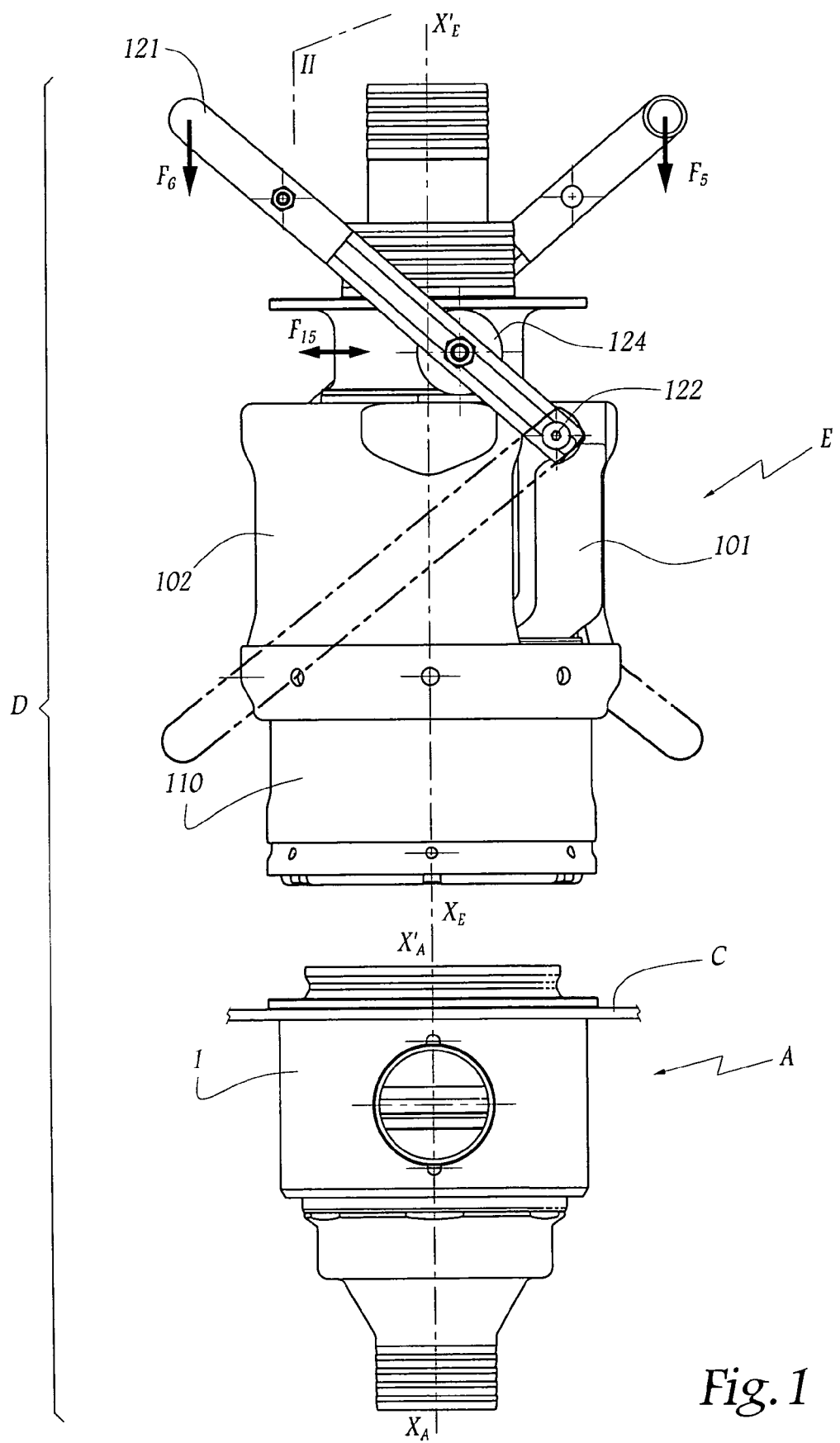
FIG. 1 is a side view of a device according to the invention of which a part is installed on an automobile vehicle shown partially in section.

Referring now to the drawings, the device D shown in the Figures is a connection comprising a connector A intended to be fixed on an automobile vehicle and a filling element E intended to be manipulated by an operator in order to fill the tank R of this vehicle.

The connector A comprises a body 1 intended to be fixed on an automobile vehicle projecting slightly with respect to the bodywork C of this vehicle.

The body 1 defines two branch connections 2 and 3 on which may be respectively connected a pipe $T_1$ for flow of the fuel up to the tank R and a pipe $T_2$ for flow of gaseous phase coming from the tank R. In order to render the drawing clearer, the tank R and the pipes $T_1$ and $T_2$ are shown solely in FIG. 2.

With the exception of the presence of the branch connection 3, the connector A is symmetrical about a vertical axis $X_A$–$X'_A$ in the Figures.

The body 1 of the connector A contains a valve 4 of which the outer face 41 is flush with an annular surface 11 formed by the neck 12 of the body 1 which projects beyond the bodywork C. The surface 11 is perpendicular to axis $X_A$–$X'_A$.

The body 1 also contains a bush 5 which is provided with a part 51 whose outer diameter is slightly smaller than the diameter of the inner surface 13 of the body 11. The bush 5 also comprises a narrowed part 52 of which the outer diameter corresponds substantially to the inner diameter of a sleeve 14 defined by the body 1.

In this way, the bush 5 is guided in translation with respect to the body 1, due to the cooperation of parts 51 and 52 respectively with zones 13 and 14 of the body 1.

The bush 51 likewise defines a central sleeve 53 in which the rod 42 of the valve 4 is guided.

A return spring 6 is arranged between the inner face 43 of the valve 4 and a zone of abutment formed at the foot of the sleeve 53, which sleeve is connected to part 51 of the bush 5 by a plurality of tabs of which only one is visible in the Figures, with reference 54.

Figure 2:
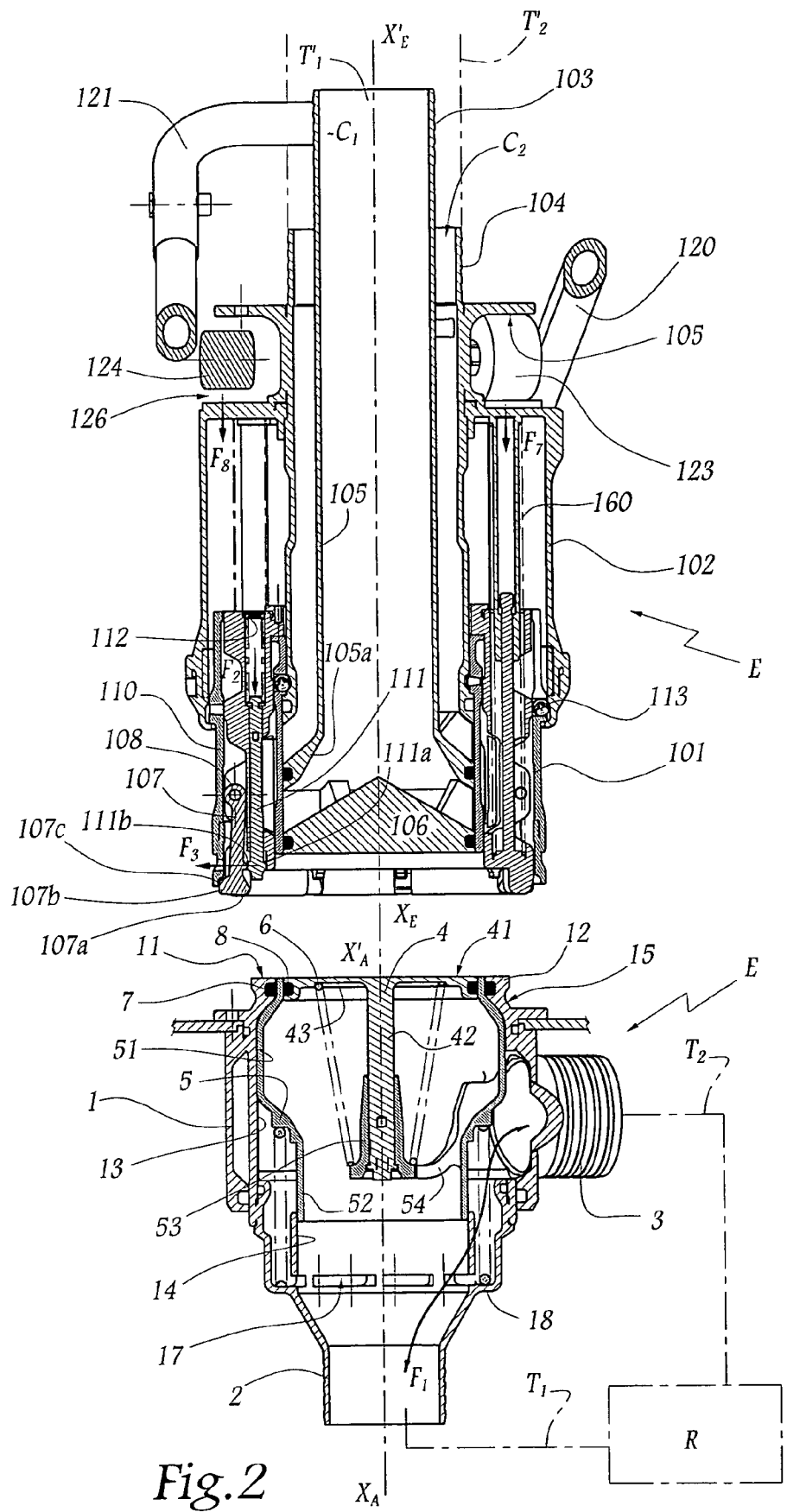
FIG. 2 is a section along plane II in FIG. 1.

When the valve 4 and the bush 5 are in the configuration of FIG. 2, the interior volume of the body 1 is isolated from the outside, while the branch connections 2 and 3 communicate together, as represented by double arrow $F_1$.

An O-ring 7 is mounted in a groove made in the inner radial surface of the body 12. Another O-ring 8 is mounted in a groove made on the peripheral surface of the valve 4. A part of the bush 5 is disposed between the O-rings 7 and 8 in the configuration of FIG. 2.

As for the filling element E, it comprises a body 101 substantially symmetrical about an axis $X_E$–$X'_E$ and with respect to which a control ring 102 is mobile, said ring defining two concentric conduits $C_2$ and $C_2$ dedicated respectively to the flow of fuel in the direction of the connector A and to the collection of gaseous phase coming from this connector.

The ring 102 is intended to be connected to two concentric pipes $T'_1$ and $T'_2$ and, to that end, forms two branch connections 103 and 104.

105 denotes the circular partition for separation between the conduits $C_1$ and $C_2$, this partition being divergent opposite the branch connection 103. In the vicinity of the divergent part 105a of the partition 105, the ring 102 forms a pusher element 106 intended to come into abutment against the face 41 of the valve 4.

Seven hooks 107 are each articulated about an axis 108 substantially perpendicular to axis $X_E$–$X'_E$ and are each provided with a nose 107a intended to engage in an outer peripheral groove 15 made on the neck 12.

A hook 107 is visible to the left of each of FIGS. 2 to 6, it being understood that the noses 107a of certain other hooks are also visible in this Figure, while the other hooks are disposed in that part of the element E torn away in FIGS. 2 to 6. In practice, the seven hooks 107 of the element E are regularly distributed about axis $X_E$–$X'_E$. Each hook 107 is also provided with a heel 107b intended to interact with a locking ring 110 as will be evident from the following explanations.

In the configuration of FIG. 2, and in the absence of outside effort, the spring 112 exerts on the associated finger 111 the effort $F_2$ which is such that the extension 111 transmits to the heel 107c an outwardly directed radial effort $F_3$ tending to pivot the hook 107 radially outwardly about its axis 108.

The same applies to all the fingers 111 and hooks 107.

Figure 3:
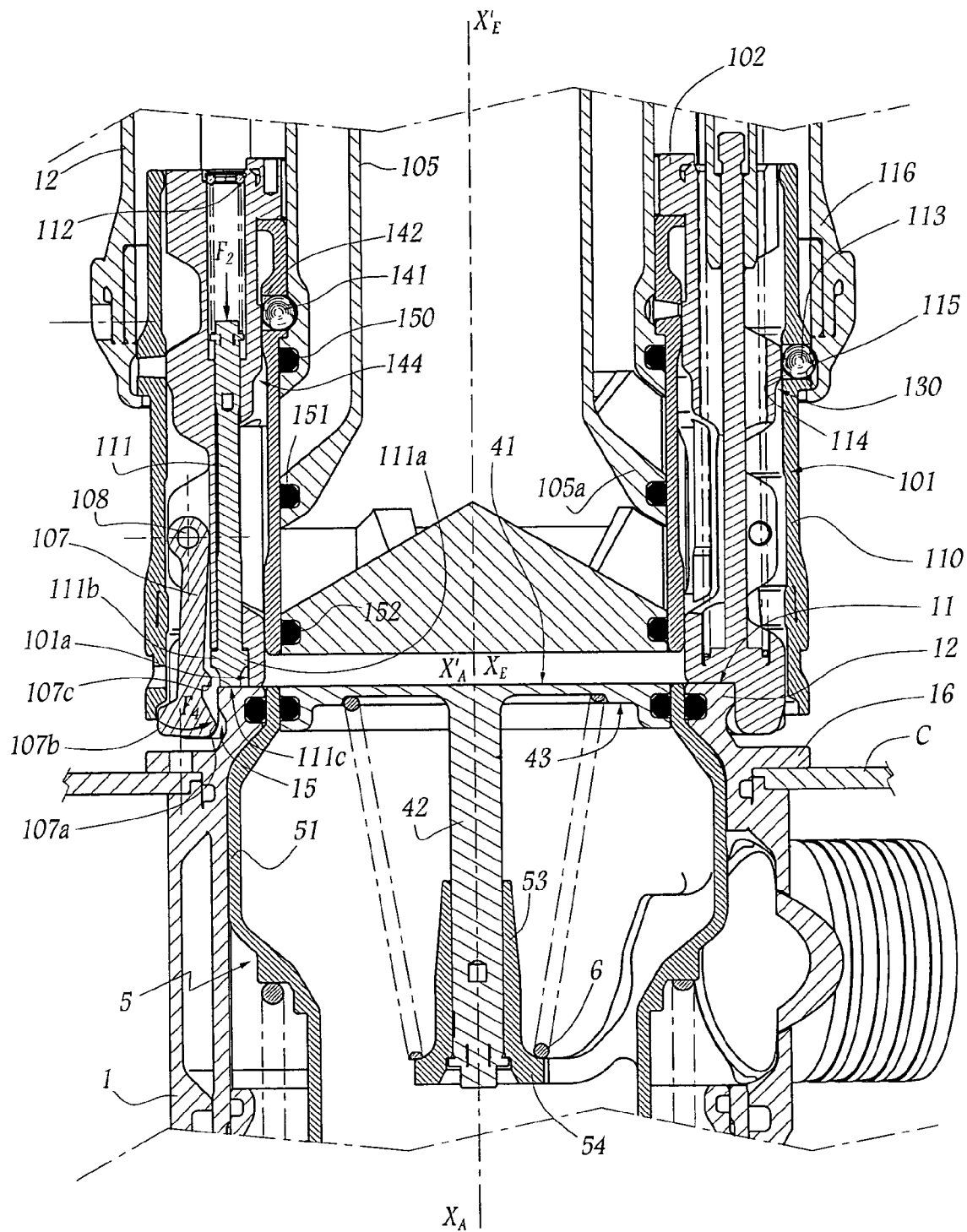
FIG. 3 is a section on a larger scale of detail III in FIG. 2 when the filling element arrives in abutment against the connector.

When, from this position, the position of FIG. 3 is attained, the hooks 107 come into place around the neck 12, which is why they are not impeded as they are tipped outwardly by the effort $F_3$. As shown in FIG. 3, the end faces 111c of the fingers 111 then come into abutment on the surface 11 of the body 1, this pushing them, parallel to axis $X_E$–$X'_E$, against the effort $F_2$.

The extension 111b of each finger 111 is in that case no longer opposite the heel 107c of the adjacent hook 107 of which the nose 107a may in that case engage in the groove 15 of the hook 12 as represented by arrow $F_4$, this making it possible to obtain a locking of the element E on the connector A.

It will be noted that each finger 111 performs a function of detection of the correct abutment of element E on the neck 12 and makes it possible to control the position of the adjacent hook 107 insofar as, as long as it is not pushed by the surface 11 of the body 1, a finger 111 opposes by its extension 111b the engagement of the nose 107a of the hook 107 in the groove 15.

When all the fingers 111 have been pushed against the elastic effort exerted by the adjacent springs 112, all the hooks 107 may come into engagement in the groove 15 and in that case no longer oppose, by their respective heels 107b, the movements of the locking ring 110 in the direction of the connector A.

Figure 4:
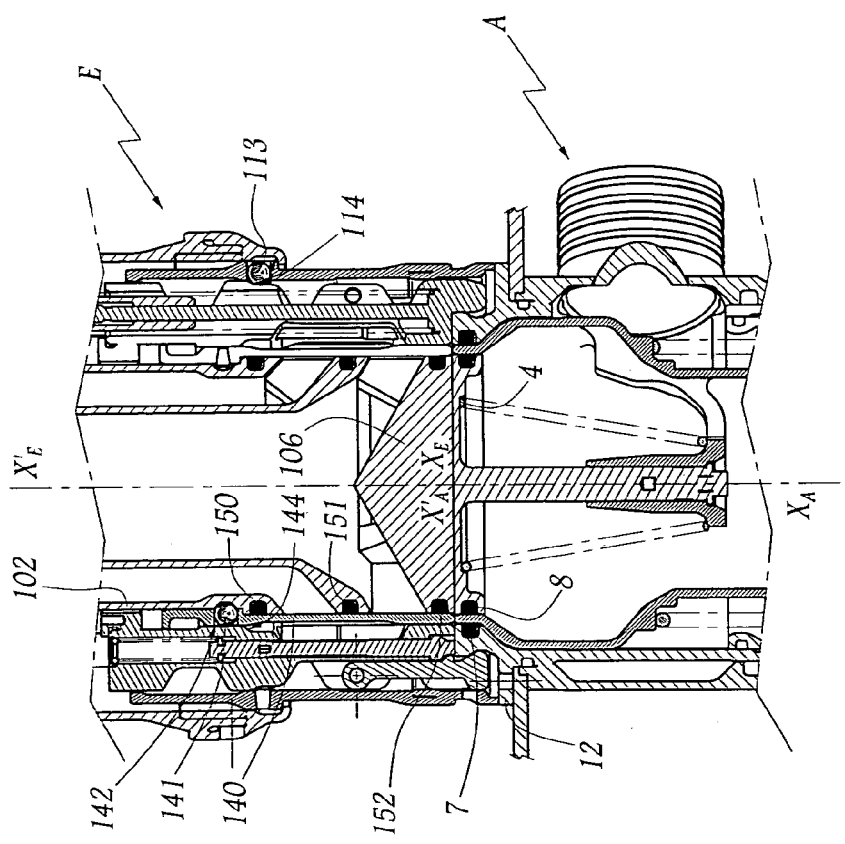
FIG. 4 is a view similar to FIG. 3, but on a smaller scale, during a subsequent step of the positioning of the filling element.

In the configuration of FIG. 4, a tight abutment is made between the element E and the connector A, this avoiding any risk of leakage, even if the valve 4 has not yet been displaced.

The displacement of the ring 110 in the direction of the connector A is controlled thanks to the ring 102 as these two rings are fast in translation parallel to axis $X_E$–$X'_E$ thanks to a plurality of balls 113 installed in housings 114 distributed about axis $X_E$–$X'_E$ in the ring 110, these balls being wider than the ring 110 and projecting in recesses 115 made on the inner radial surface of an outer part 116 of the ring 102.

The displacement of the control ring parallel to axis $X_E$–$X'_E$ is controlled by two handles 120 and 121 each articulated on the body 102 about an axis 122 or equivalent perpendicular to axis $X_E$–$X'_E$.

The handle 120 bears a roller 123, while the handle 121 bears a roller 124, these rollers each being disposed in a housing 125, 126 respectively, made in the outer surface of the ring 102. The rollers 123 and 124 may move in the housings 125 and 126 perpendicularly to the directions $X_E$–$X'_E$ and 122, this being represented by the double arrow $F_{15}$ in FIG. 1.

In practice, the handle 120 is provided to pass from the configuration represented in solid lines to that represented in mixed lines in FIG. 1, the roller 123 in that case making a reciprocating movement in the housing 125.

In the same way, the handle 121 may attain a low configuration represented solely by its end in mixed lines in FIG. 1.

The passage of the handles 120 and 121 from their configuration represented in solid lines to that represented in mixed lines takes place by exerting thereon efforts $F_5$ and $F_6$ directed towards the connector A when the element E is in abutment against the connector A.

Due to the efforts $F_5$ and $F_6$, the rollers 123 and 124 exert on the ring 102 efforts $F_7$ and $F_8$ which may be transmitted, through the balls 113, to the locking ring 110.

Figure 5:
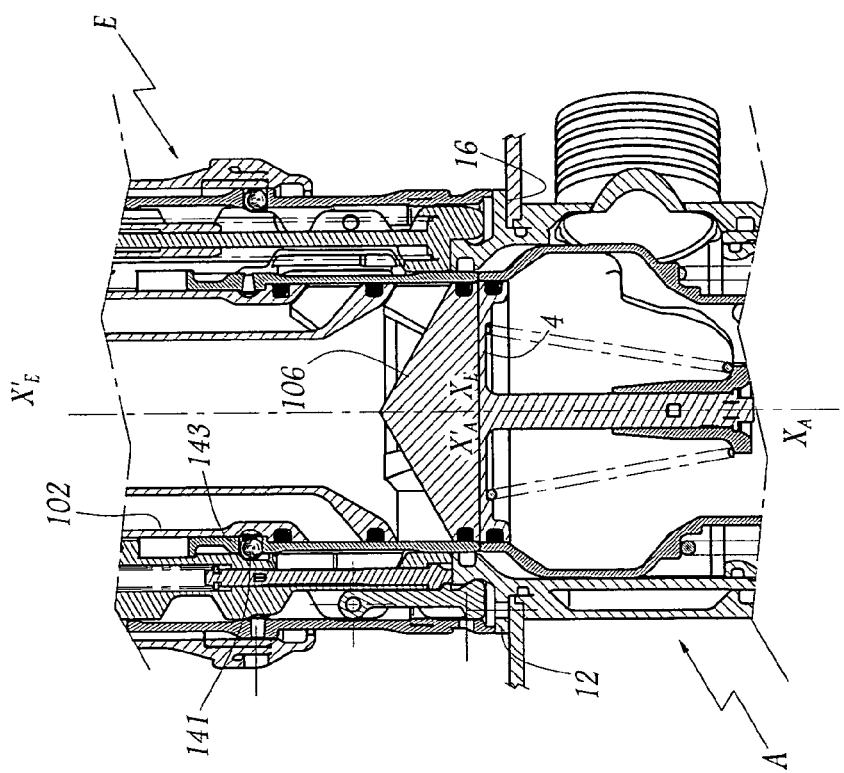
FIG. 5 is a view similar to FIG. 4 during another subsequent step.

If the application of the efforts $F_5$ and $F_6$ from the configuration of FIG. 4 is continued, the rings 102 and 110 are disconnected in translation as the ring 110 comes opposite a recess 130 made in the body 102, with the result that each ball 113 may be driven towards the adjacent recess 130, this allowing the continuation of the movement of lowering of the ring 102 during the passage from the configuration of FIG. 4 to that of FIG. 5, the ring 110 remaining in abutment on an outer radial flange 16 of the neck 12.

Furthermore, a slide in the form of a sleeve 140 is rendered fast in translation with the ring 102 thanks to a plurality of balls 141 received in housings 142 of the slide 140 distributed about the axis $X_E$–$X'_E$, these balls projecting in the direction of recesses 143 made in the ring 102.

In this way, continuation of the movement of the control ring 102 in the direction of the connector A has the effect of also displacing the slide 140 which pushes the bush 5, while the pusher element 106 pushes the valve 4.

The slide 140 then comes into contact with the O-ring 7 with which it ensures a tight contact, as represented in FIG. 5.

The ring 102 is provided with three O-rings 150, 151 and 152 which are all in abutment against the inner radial surface of the slide 140 in the configurations of FIGS. 2 to 5.

It will be noted that, in the configuration of FIG. 5, a tight contact between parts 140 and 1 is obtained, even if no flow has occurred yet, this being an intrinsic token of safety of the device.

In the configuration of FIG. 5, the balls 141 are opposite a recess 144 made in the body 102, this making it possible to disconnect the elements 102 and 140 in translation.

If the application of efforts $F_5$ and $F_6$ on the handles 120 and 121 is continued, the continuation of the movements of the ring 102 in the direction of the connector A has the effect of pushing the valve 4 against the elastic effort generated by the spring 6, thanks to the pusher element 106. When the spring 6 is compressed, this also has the effect of displacing the bush 5 up to the configuration of FIG. 6 where its part 52 obturates the openings 17 made between the sleeve 14 and an annular web 18 of the body 1. In this way, the bush 5 isolates the branch connections 2 and 3, i.e. the tubes $T_1$ and $T_2$, with respect to each other.

By reason of the movement of the ring 102, its divergent part 105a comes opposite that part of the bush 5 previously disposed between the O-rings 7 and 8, with the result that a communication is created between the channel $C_1$ and the branch connection 2 around the pusher element 6 and the valve 4, as well as a communication between the branch connection 3 and the channel $C_2$ around the partition 105.

Figure 6:
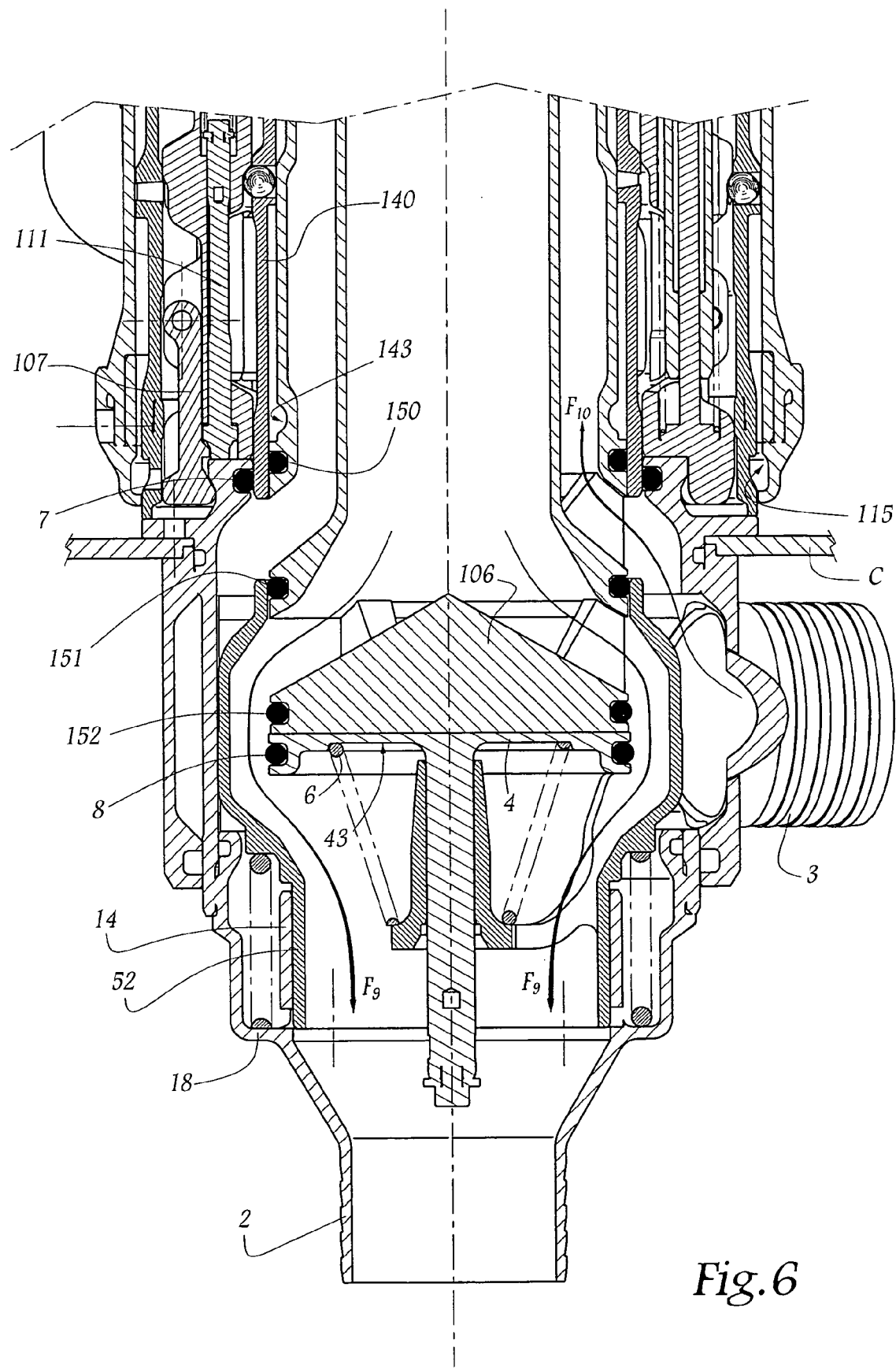
FIG. 6 is a view similar to FIG. 3 when the filling element and the connector are in established fluidic communication, to which the bottom of the view of FIG. 2 has been added.

The flow of fuel occurs as represented by arrows $F_9$ in FIG. 6, while the flow of the gaseous phase occurs as represented by arrows $F_{10}$.

Return springs 160 are disposed between the body 101 and the ring 102, with the result that, in the event of elimination of the efforts $F_5$ and $F_6$, these springs cause the control ring 102 to follow a movement inverse to that previously described, this leading to a disconnection of the elements A and E. In other words, the device of the invention may be considered as being equipped with a "dead man" system, springs 160 ensuring an automatic disconnection in the event of the operator stopping his action.

Among the advantages of the device of the invention, it may be noted that the connector A may be a very light part which does not project over a considerable distance with respect to the bodywork C, with the result that it does not risk injuring an operator or a pilot.

Furthermore, in the configuration of FIG. 6, the section of flow of the fuel is large, this allowing a high rate of filling of the tank R. In practice, a flowrate of the order of 90 litres in 28 seconds may be attained.

Taking into account its structure, the element E is light, while presenting good ergonomics, particularly due to the mode of actuation of the handles 120 and 121.

Taking into account the characteristics of the device 1, there is very little risk of leakages or drainings occurring at the level of the surfaces of the elements A and E in contact, while these elements are particularly robust. A final essential point is that the risks of false manœuvre are set aside, even if the operator acts under conditions of intense stress during a race.

What is claimed is:

1. Device for filling a vehicle tank with liquid fuel, said device comprising a connector on-board the vehicle, connected to said tank at least via a pouring conduit and provided with a closure valve, and a filling element adapted to be connected on this connector, wherein said filling element is provided with at least one member for detecting the abutment of said filling element on a fixed part of said connector, said member being adapted to control the displacement of a hook for locking said element on said connector, between a first position where said hook is disengaged with respect to said connector and a second position where said hook is in engagement on said connector.

2. The device of claim 1, wherein it comprises a plurality of detection members distributed about a central axis of said filling element and each adapted to control a locking hook.

3. The device of claim 1, wherein said or each detection member is in the form of a finger mobile in translation in a direction substantially parallel to a central axis of said filling element.

4. The device of claim 1, wherein said or each locking hook is adapted to prevent the displacement of a locking ring when it is not in engagement with said connector, said ring itself being adapted to prevent the displacement of a control member forming part of said filling element and mobile, with respect to the body of said element, in a direction parallel to a central axis of said element.

5. The device of claim 4, wherein said locking ring is adapted to surround said hook or hooks when said hook(s) is or are in said second position.

6. The device of claim 4, wherein that said kinematic linkage between said locking ring and said control member is a function of the position of said control member with respect to said body.

7. The device of claim 6, wherein it comprises at least one element for blocking the relative movement of said locking ring and of said control member, said blocking element being received in a housing made to that end in said ring and adapted to be partially engaged, or not, in a housing made to that end in said control member.

8. The device of claim 4, wherein that the filling element comprises a slide in the form of a tubular sleeve adapted to come into abutment against an O-ring provided on an inner radial surface of said connector, the displacement of said slide with respect to said body of said element being controlled by said control member.

9. The device of claim 8, wherein the kinematic linkage between said slide and said control member is a function of the position of said control member with respect to said body.

10. The device of claim 1, wherein said connector is provided with an outer peripheral groove for receiving a part of said hook or hooks when it is or they are in said second position.

11. The device of claim 1, wherein said connector is connected to said tank by a fuel flow conduit and by a gaseous phase circulation conduit, while a mobile member is adapted to pass, within said connector, from a first configuration where said mobile member allows a fluidic communication between said conduits and a second configuration where this member isolates these conduits from each other.

12. The device of claim 11, wherein said mobile member is adapted to be displaced from said first towards said second configuration by a part of said filling element.

13. The device of claim 12, wherein said or each locking hook is adapted to prevent the displacement of a locking ring when it is not in engagement with said connector, said ring itself being adapted to prevent the displacement of a control member forming part of said filling element and mobile, with respect to the body of said element, in a direction parallel to a central axis of said element and wherein said mobile member is adapted to be displaced from said first towards said second configuration by a pusher element fast with said control member and adapted to push said valve of said connector against elastic closure means, said valve itself being adapted to displace said mobile member.

14. The device of claim 1, wherein said filling element forms two conduits dedicated respectively to the flow of fuel towards said tank and for the circulation of gaseous phase coming from said tank, the connector itself being connected to said tank by two conduits respectively dedicated to the flow of fuel and to the circulation of gaseous phase, said fuel flow conduits being adapted to be fluidically connected, while said gaseous phase circulation conduits are adapted to be fluidically connected.

15. The device of claim 1, wherein the movements of those parts of said filling element which are mobile with respect to the body of said element are controlled by at least one handle articulated on said body about an axis substantially orthogonal to the directions of displacement of said mobile parts with respect to said body.

16. The device of claim 15, wherein said handle is equipped with a roller for transmission of effort to one of said mobile parts, said roller being received, with possibility of displacement, in a housing of corresponding shape, made in said mobile part.

17. The device of claim 1, wherein it comprises means for elastic return of at least certain of the parts of said filling element mobile with respect to its body and/or of at least certain of the parts of said connector mobile with respect to said fixed part towards configurations of closure and of separation of said element and of said connector.

* * * * *